(12) United States Patent
Kamei

(10) Patent No.: US 11,365,777 B2
(45) Date of Patent: Jun. 21, 2022

(54) FRICTION MATERIAL

(71) Applicant: TUNGALOY CORPORATION, Fukushima (JP)

(72) Inventor: Mitsuo Kamei, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 250 days.

(21) Appl. No.: 16/725,468

(22) Filed: Dec. 23, 2019

(65) Prior Publication Data

US 2020/0208700 A1 Jul. 2, 2020

(30) Foreign Application Priority Data

Dec. 28, 2018 (JP) .............................. JP2018-246727

(51) Int. Cl.
| | |
|---|---|
| *F16C 33/12* | (2006.01) |
| *F16D 69/02* | (2006.01) |
| *C25D 5/14* | (2006.01) |
| *C25D 7/00* | (2006.01) |
| *F16D 69/00* | (2006.01) |

(52) U.S. Cl.
CPC .............. *F16D 69/027* (2013.01); *C25D 5/14* (2013.01); *C25D 7/00* (2013.01); *F16D 2069/001* (2013.01); *F16D 2069/005* (2013.01); *F16D 2200/0021* (2013.01); *F16D 2200/0026* (2013.01)

(58) Field of Classification Search
CPC ............. F16D 69/027; F16D 2069/001; F16D 2069/005; F16D 2200/0021; F16D 2200/0026; F16D 2250/0046; F16D 2200/0008; F16D 2069/045; B60T 8/26; C25D 7/00; C25D 5/14; C25D 5/50
USPC ........................................................ 508/103
See application file for complete search history.

(56) References Cited

U.S. PATENT DOCUMENTS

2019/0055664 A1* 2/2019 Zimmermann .......... C25D 3/08
2020/0309221 A1* 10/2020 Kamei .................... C23C 30/00

FOREIGN PATENT DOCUMENTS

JP 2002-031177 A 1/2002

* cited by examiner

*Primary Examiner* — Prem C Singh
*Assistant Examiner* — Francis C Campanell
(74) *Attorney, Agent, or Firm* — Studebaker & Brackett PC

(57) ABSTRACT

A friction material comprising a Fe part; a coating layer formed over a surface of the Fe part; and a friction part formed on a surface of at least a part of the coating layer wherein: the coating layer comprises a first coating layer and a second coating layer in order from Fe part side, the first coating layer is constituted of an alloy containing Cu, Ni and Fe such that Fe content be not less than 10 atom %, the second coating layer is constituted of an alloy containing Cu and Ni, or an alloy containing Cu, Ni and Fe such that Fe content be less than 10 atom %, an average thickness of the first coating layer is not less than 1.0 μm and not more than 6.0 μm; and an average thickness of the second coating layer is not less than 9.5 μm and not more than 24.0 μm.

20 Claims, 1 Drawing Sheet

FRICTION MATERIAL

TECHNICAL FIELD

The present invention relates to a friction material.

BACKGROUND ART

A friction material is used for means for controlling, as desired, rotation or movement of various types of machines such as machine tools, construction machinery, agricultural machinery, automobiles, two-wheeled vehicles, trains, aircrafts, and ships; namely clutches or brakes.

As such a friction material, for example, Patent Publication JP-A-2002-31177 describes a sintered material superior in rust-prevention, made by diffusion bonding of a metallic lining material to an iron back plate via copper coating through sintering, wherein coating of nickel, chromium, or nickel-chromium is laid between the surface of the back plate and the copper coating.

SUMMARY

Technical Problem

A conventional friction material that is made by sintering-bonding a friction part to a back plate (for example, a steel material) via copper plating has inferior corrosion resistance because there are many pinholes formed in the plating in sintering. When such a friction material is used as, for example, a brake pad, water containing salt derived from a snow melting agent (calcium chloride) or seawater (sodium chloride) enters from the pinholes while a vehicle is running, to corrode the back plate. As the corrosion of the back plate progresses, rust gathered by the interface between the back plate and the plating eats deeply, which leads to a decline in bonding strength of the back plate and the friction part, and finally, a problem to such an extent that the friction part peels from the back plate.

In such a friction material, generally, copper plating of not less than 30 µm in coating thickness is necessary for filling the pinholes to improve the corrosion resistance. However, forming plating of not less than 30 µm in coating thickness by electroplating causes products to have a wide variation of coating thickness, which may lead to faulty products in dimension. Further, this makes the plating time longer, which leads to increase in costs. In addition, an excessively thick layer of plating may cause peeling thereof.

The present invention has been made in light of the above circumstances, and an object of the present invention is to provide a friction material superior in corrosion resistance, and superior in adhesion of a back plate and a friction part.

Solution to Problem

The present inventor has conducted studies regarding a friction material and has then found that bonding a back plate and a friction part in a friction material via a specific coating layer may give the friction material superior in corrosion resistance, and superior in adhesion of the back plate and the friction part, and this has led to the completion of the present invention.

That is, the summary of the present invention is as follows:

[1]

A friction material comprising a Fe part which contains Fe as a main component; a coating layer formed over a surface of the Fe part; and a friction part formed on a surface of at least a part of the coating layer, wherein:

the coating layer comprises a first coating layer and a second coating layer in order from Fe part side, the first coating layer is constituted of an alloy containing Cu, Ni and Fe such that Fe content be not less than 10 atom %, the second coating layer is constituted of an alloy containing Cu and Ni, or an alloy containing Cu, Ni and Fe such that Fe content be less than 10 atom %, an average thickness of the first coating layer is not less than 1.0 µm and not more than 6.0 µm; and an average thickness of the second coating layer is not less than 9.5 µm and not more than 24.0 µm.

[2]

The friction material according to [1], wherein the first coating layer contains not less than 1 atom % and not more than 45 atom % of Cu, not less than 1 atom % and not more than 45 atom % of Ni, and not less than 10 atom % and not more than 95 atom % of Fe.

[3]

The friction material according to [1] or [2], wherein the second coating layer contains not less than 5 atom % and not more than 60 atom % of Cu, not less than 40 atom % and not more than 95 atom % of Ni, and not less than 0 atom % and less than 10 atom % of Fe.

[4]

The friction material according to any one of [1] to [3], wherein:

the second coating layer comprises a lower part and an upper part in order from first coating layer side;

the lower part contains not less than 5 atom % and less than 20 atom % of Cu; and the upper part contains not less than 20 atom % and not more than 60 atom % of Cu.

[5]

The friction material according to [4], wherein an average thickness of the lower part is not less than 8.0 µm and not more than 20.0 µm, and an average thickness of the upper part is not less than 1.5 µm and not more than 10.0 µm.

[6]

The friction material according to [4] or [5], wherein the lower part contains not less than 5 atom % and less than 20 atom % of Cu, more than 80 atom % and not more than 95 atom % of Ni, and not less than 0 atom % and less than 10 atom % of Fe.

[7]

The friction material according to any one of [4] to [6], wherein the upper part contains not less than 20 atom % and not more than 60 atom % of Cu, not less than 40 atom % and not more than 80 atom % of Ni, and not less than 0 atom % and not more than 2 atom % of Fe.

[8]

The friction material according to any one of [1] to [7], wherein:

the coating layer comprises a third coating layer over a surface of the second coating layer, the surface being opposite to the Fe part, the third coating layer is constituted of an alloy containing Cu, Ni and Sn, an alloy containing Cu, Ni and Zn, or an alloy containing Cu, Ni, Sn and Zn; and an average thickness of the third coating layer is not less than 0.1 µm and not more than 5.0 µm.

[9]

The friction material according to [8], wherein the third coating layer contains not less than 30 atom % and not more than 69.5 atom % of Cu, not less than 30 atom % and not more than 69.5 atom % of Ni, and not less than 0.5 atom % and not more than 5 atom % of Sn and/or Zn.

[10]

The friction material according to any one of [1] to [9], wherein an average thickness of the coating layer is not less than 10.5 μm and less than 30.0 μm.

Advantageous Effects of Invention

The present invention may provide a friction material superior in corrosion resistance, and superior in adhesion of a back plate and a friction part.

DESCRIPTION OF EMBODIMENTS

Figure 1:
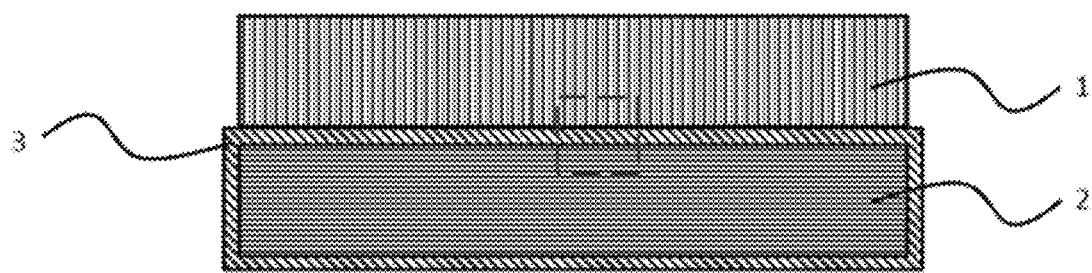
FIG. 1 is a schematic cross-sectional view illustrating one example of the friction material of the present invention.

An embodiment for carrying out the present invention (hereinafter simply referred to as the "present embodiment") will hereinafter be described in detail, with reference to the attached drawings as appropriate. However, the present invention is not limited to the present embodiment below. Various modifications may be made to the present invention without departing from the gist of the invention. In the drawings, unless otherwise specified, positional relationships, such as vertical and horizontal relationships, are based on the positional relationships shown in the drawings. Further, the dimensional ratios of the drawings are not limited to those shown therein.

The friction material of the present embodiment includes a Fe part which contains Fe as the main component, a coating layer formed over a surface of the Fe part, and a friction part formed on a surface of at least a part of the coating layer; the coating layer includes a first coating layer and a second coating layer in order from the Fe part side, the first coating layer is constituted of an alloy containing Cu, Ni and Fe such that Fe content be not less than 10 atom %, the second coating layer is constituted of an alloy containing Cu and Ni, or an alloy containing Cu, Ni and Fe such that Fe content be less than 10 atom %, an average thickness of the first coating layer is not less than 1.0 μm and not more than 6.0 μm, and an average thickness of the second coating layer is not less than 9.5 μm and not more than 24.0 μm.

The friction material of the present embodiment comprises the above-described configurations, and thereby is superior in corrosion resistance, and superior in adhesion of the Fe part, which is a back plate, and the friction part. The factors for the improvements of the corrosion resistance and adhesion of the friction material of the present embodiment can be considered to be as set forth as follows. However, the present invention is not in any way limited by the factors set forth below.

The friction material of the present embodiment includes the Fe part which contains Fe as the main component, the coating layer formed over the surface of the Fe part, and the friction part formed on the surface of at least a part of the coating layer. In the present embodiment, "the main component is Fe" means that the Fe part contains not less than 50 mass % of Fe. This makes it possible to sufficiently diffuse Fe into the first coating layer when the coating layer is formed over the surface of the Fe part. The friction material of the present embodiment includes, as a coating layer, the first coating layer and the second coating layer in order from the Fe part side, which makes it possible to prevent pinholes that can be formed in the coating layer from piercing through the Fe part, as a result to improve the corrosion resistance. In the friction material of the present embodiment, the first coating layer is constituted of an alloy containing Cu, Ni and Fe such that Fe content be not less than 10 atom %, which improves the adhesion of the Fe part and the coating layer. In the friction material of the present embodiment, the second coating layer is constituted of an alloy containing Cu and Ni, or an alloy containing Cu, Ni and Fe such that Fe content be less than 10 atom %, which may suppress rust generation, to improve the corrosion resistance. In the friction material of the present embodiment, the first coating layer has an average thickness of not less than 1.0 μm, which improves the adhesion of the Fe part and the coating layer; and the first coating layer has an average thickness of not more than 6.0 μm, and the layer containing at least a specific amount of Fe is not too thick, which improve the corrosion resistance. In the friction material of the present embodiment, the second coating layer has an average thickness of not less than 9.5 μm, which improves the corrosion resistance, and the second coating layer has an average thickness of not more than 24.0 μm, which may lead to uniform formation of the coating layer.

The combination of the above configurations allows for the friction material of the present embodiment to be superior in corrosion resistance, and superior in adhesion of the Fe part, which is a back plate, and the friction part.

Figure 2:
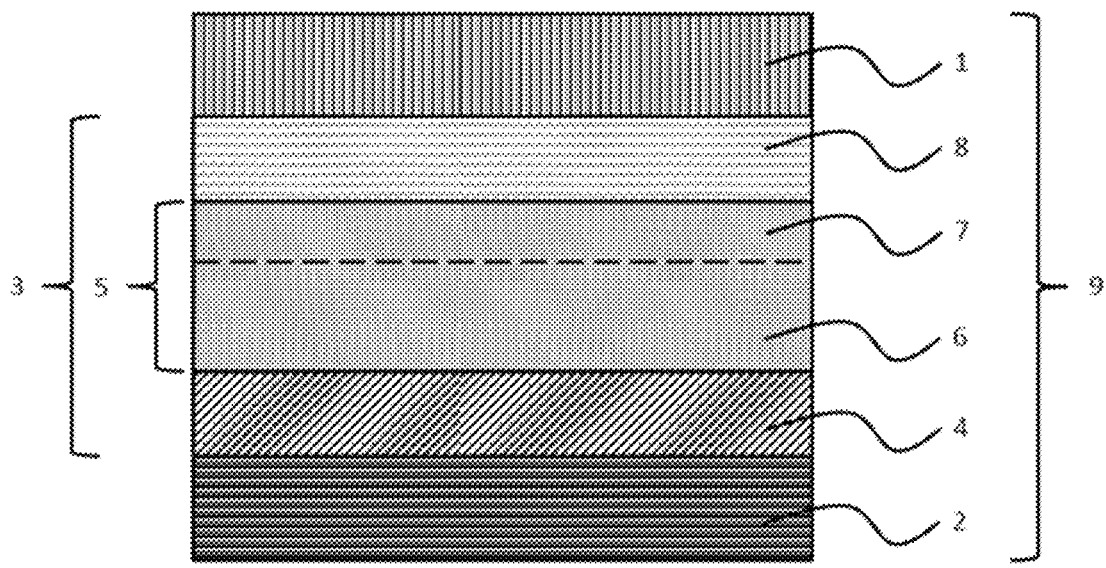
FIG. 2 is an enlarged schematic cross-sectional view of a portion surrounded by the dotted lines in the friction material in FIG. 1.

FIG. 1 is a schematic cross-sectional view illustrating one example of the friction material of the present embodiment. The friction material in FIG. 1 includes an Fe part 2 which contains Fe as the main component, a coating layer 3 formed over the surface of the Fe part 2, and a friction part 1 formed over the surface of at least a part of the coating layer. FIG. 2 is an enlarged schematic cross-sectional view of a portion surrounded by the dotted lines in the friction material in FIG. 1. In a friction material 9 in FIG. 2, the coating layer 3 includes a first coating layer 4, a second coating layer 5, and a third coating layer 8 in order from the Fe part 2 side; and the second coating layer 5 includes a lower part 6 and an upper part 7 in order from the first coating layer side.

Coating Layer

The coating layer used in the present embodiment includes the first coating layer and the second coating layer in order from the Fe part side. The coating layer used in the present embodiment including the first coating layer and the second coating layer may prevent pinholes from piercing through the Fe part. As a result, the corrosion resistance of the friction material of the present embodiment improves.

The average thickness of the coating layer is preferably not less than 10.5 μm and less than 30.0 μm. When the average thickness of the coating layer is not less than 10.5 μm, the corrosion resistance of the friction material of the present embodiment tends to further improve. When the average thickness of the coating layer is less than 30.0 μm, coating layers tend to have a small variation of average thickness to improve dimensional accuracy, peeling of the coating layer tends to be suppressible, and further the plating time may be shortened to result in low cost, as for the friction material of the present embodiment. From the same point of view, the average thickness of the coating layer is more preferably not less than 13.0 μm and not more than 29.5 μm, and further preferably not less than 16.0 μm and not more than 29.0 μm.

First Coating Layer

The first coating layer used in the present embodiment is constituted of an alloy containing Cu, Ni and Fe such that Fe content be not less than 10 atom %. In the first coating layer, the Cu content is preferably not less than 1 atom % and not more than 45 atom %, the Ni content is preferably not less than 1 atom % and not more than 45 atom %, and the Fe content is preferably not less than 10 atom % and not more than 95 atom %. In the friction material of the present embodiment, the first coating layer containing not less than 1 atom % of Cu tends to prevent the hardness of the first coating layer from being higher, to improve the adhesion of the Fe part and the first coating layer; the first coating layer containing not more than 45 atom % of Cu tends to suppress decrease of the Ni content rate, to improve the corrosion resistance. In the friction material of the present embodiment, the first coating layer containing not less than 1 atom % of Ni tends to improve the corrosion resistance; and the first coating layer containing not more than 45 atom % of Ni tends to prevent the hardness of the first coating layer from being higher, to improve the adhesion of the Fe part and the first coating layer. In the friction material of the present embodiment, the first coating layer containing not less than 10 atom % of Fe improves the adhesion of the Fe part and the coating layer; and the first coating layer containing not more than 95 atom % of Fe tends to improve the adhesion of the first coating layer and the second coating layer. From the same point of view, the Cu content in the first coating layer is more preferably not less than 5 atom % and not more than 45 atom %, further preferably not less than 10 atom % and not more than 45 atom %, and particularly preferably not less than 16 atom % and not more than 43 atom %; the Ni content in the first coating layer is more preferably not less than 2 atom % and not more than 43 atom %, and further preferably not less than 3 atom % and not more than 40 atom %; and the Fe content in the first coating layer is more preferably not less than 12 atom % and not more than 90 atom %, further preferably not less than 15 atom % and not more than 80 atom %, and particularly preferably not less than 17 atom % and not more than 73 atom %.

The average thickness of the first coating layer used in the present embodiment is not less than 1.0 μm and not more than 6.0 μm. In the friction material of the present embodiment, when the first coating layer has an average thickness of not less than 1.0 μm, this leads to improved adhesion of the Fe part and the coating layer; and when the first coating layer has an average thickness of not more than 6.0 μm, and the layer containing at least a specific amount of Fe is not too thick, this leads to improved corrosion resistance. From the same point of view, the average thickness of the first coating layer is preferably not less than 1.5 μm and not more than 5.5 μm, and more preferably not less than 1.5 μm and not more than 5.2 μm.

Second Coating Layer

The second coating layer used in the present embodiment is constituted of an alloy containing Cu and Ni, or an alloy containing Cu, Ni and Fe such that Fe content be less than 10 atom %. In the second coating layer, the Cu content is preferably not less than 5 atom % and not more than 60 atom %, the Ni content is preferably not less than 40 atom % and not more than 95 atom %, and the Fe content is preferably not less than 0 atom % and less than 10 atom %. In the friction material of the present embodiment, the second coating layer containing not less than 5 atom % of Cu tends to prevent the hardness of the second coating layer from being higher, to improve adhesion; the second coating layer containing not more than 60 atom % of Cu tends to suppress decrease of the Ni content rate, to improve the corrosion resistance. In the friction material of the present embodiment, the second coating layer containing not less than 40 atom % of Ni tends to improve the corrosion resistance; and the second coating layer containing not more than 95 atom % of Ni tends to prevent the hardness of the second coating layer from being higher, to improve adhesion. In the friction material of the present embodiment, the second coating layer containing less than 10 atom % of Fe may suppress rust generation, to improve the corrosion resistance. From the same point of view, the Cu content in the second coating layer is more preferably not less than 5 atom % and not more than 55 atom %, further preferably not less than 6 atom % and not more than 50 atom %, and particularly preferably not less than 8 atom % and not more than 45 atom %; the Ni content in the second coating layer is more preferably not less than 45 atom % and not more than 93 atom %, further preferably not less than 50 atom % and not more than 92 atom %, and particularly preferably not less than 55 atom % and not more than 91 atom %; and the Fe content in the second coating layer is more preferably not less than 0 atom % and not more than 7 atom %, further preferably not less than 0 atom % and not more than 5 atom %, and particularly preferably not less than 0 atom % and not more than 4 atom %.

The average thickness of the second coating layer used in the present embodiment is not less than 9.5 μm and not more than 24.0 μm. In the friction material of the present embodiment, when the second coating layer has an average thickness of not less than 9.5 μm, this leads to improved corrosion resistance, and when the second coating layer has an average thickness of not more than 24.0 μm, this leads to uniform formation of the coating layer. From the same point of view, the average thickness of the second coating layer is preferably not less than 11.0 μm and not more than 23.9 μm, more preferably not less than 12.5 μm and not more than 23.8 μm, and further preferably not less than 13.4 μm and not more than 23.8 μm.

The second coating layer used in the present embodiment preferably includes the lower part and the upper part in order from the first coating layer side. In the lower part, the Cu content is not less than 5 atom % and less than 20 atom %. In the upper part, the Cu content is not less than 20 atom % and not more than 60 atom %. The second coating layer including the lower part and the upper part may prevent pinholes from piercing through the Fe part. As a result, the corrosion resistance of the friction material of the present embodiment tends to further improve.

In the lower part, preferably, the Cu content is not less than 5 atom % and less than 20 atom %, the Ni content is more than 80 atom % and not more than 95 atom %, and the Fe content is not less than 0 atom % and less than 10 atom %. The Cu, Ni and Fe contents in the lower part within the foregoing ranges tend to much further improve the corrosion resistance of the friction material of the present embodiment. The reason for this is unclear, but it is believed that when the Cu content rate is lowered in the lower part, the Ni content rate relatively rises, and as a result, the corrosion resistance of the friction material of the present embodiment much further improves. From the same point of view, in the lower part, more preferably, the Cu content is not less than 6 atom % and not more than 18 atom %, the Ni content is not less than 81 atom % and not more than 93 atom %, and the Fe content is not less than 0 atom % and not more than 7 atom %; and further preferably, the Cu content is not less than 8 atom % and not more than 15 atom %, the Ni content is not less than 83 atom % and not more than 91 atom %, and the Fe content is not less than 0 atom % and not more than 4 atom %.

In the upper part, preferably, the Cu content is not less than 20 atom % and not more than 60 atom %, the Ni content is not less than 40 atom % and not more than 80 atom %, and the Fe content is not less than 0 atom % and not more than 2 atom %. The Cu, Ni, and Fe contents in the upper part within the foregoing ranges tend to give much further superior adhesion of the second coating layer and the friction part, and much further superior adhesion of the second coating layer and a third coating layer. The reason for this is unclear, but it is believed that when the Cu content rate is raised in the upper part, the Ni content rate relatively lowers, and as a result, it is suppressed that the second coating layer hardens too much. From the same point of view, in the upper part, more preferably, the Cu content is not less than 22 atom % and not more than 50 atom %, the Ni content is not less than 50 atom % and not more than 78 atom %, and the Fe content is not less than 0 atom % and not more than 2 atom %; and further preferably, the Cu content is not less than 24 atom % and not more than 45 atom %, the Ni content is not less than 55 atom % and not more than 77 atom %, and the Fe content is not less than 0 atom % and not more than 2 atom %.

The average thickness of the lower part is preferably not less than 8.0 μm and not more than 20.0 μm. The lower part having an average thickness of not less than 8.0 μm tends to allow pinholes to be prevented from piercing through the Fe part, and the lower part having an average thickness of not more than 20.0 μm prevents the upper part from thinning, and as a result, tends to give much further superior adhesion of the second coating layer and the friction part, and much further superior adhesion of the second coating layer and the third coating layer. From the same point of view, the average thickness of the lower part is more preferably not less than 9.0 μm and not more than 19.0 μm, and further preferably not less than 10.2 μm and not more than 18.4 μm.

The average thickness of the upper part is preferably not less than 1.5 μm and not more than 10.0 μm. The upper part having an average thickness of not less than 1.5 μm may prevent pinholes from piercing through the Fe part, tends to give much further superior adhesion of the second coating layer and the friction part, and much further superior adhesion of the second coating layer and the third coating layer; and the upper part having an average thickness of not more than 10.0 μm prevents the lower part from thinning, and as a result, tends to give further superior corrosion resistance. From the same point of view, the average thickness of the upper part is more preferably not less than 2.5 μm and not more than 9.0 μm, and further preferably not less than 2.8 μm and not more than 8.2 μm.

Third Coating Layer

The coating layer used in the present embodiment preferably includes the third coating layer over a surface of the second coating layer which is opposite to the Fe part side. The third coating layer is preferably constituted of an alloy containing Cu, Ni and Sn, an alloy containing Cu, Ni and Zn, or an alloy containing Cu, Ni, Sn and Zn. The third coating layer constituted of an alloy containing Cu, Ni and Sn tends to further improve the adhesion to the friction part. The reason for this is unclear, but it is believed that the third coating layer containing Sn may make hardness thereof further lower. Zn instead of Sn in the third coating layer may also lead to the same effect. Therefore, the third coating layer may be a layer constituted of an alloy containing Cu, Ni and Zn, or an alloy containing Cu, Ni, Sn and Zn.

In the third coating layer, preferably, the Cu content is not less than 30 atom % and not more than 69.5 atom %, the Ni content is not less than 30 atom % and not more than 69.5 atom %, and the Sn and/or Zn content is not less than 0.5 atom % and not more than 5 atom %. The coating layer used in the present embodiment including the third coating layer having such Cu, Ni and Sn and/or Zn contents within the foregoing ranges may prevent pinholes from piercing through the Fe part, and as a result, tends to further improve the corrosion resistance of the friction material of the present embodiment. From the same point of view, in the third coating layer, more preferably, the Cu content is not less than 35 atom % and not more than 54 atom %, the Ni content is not less than 45 atom % and not more than 64 atom %, and the Sn and/or Zn content is not less than 1 atom % and not more than 5 atom %; and further preferably, the Cu content is not less than 38 atom % and not more than 42 atom %, the Ni content is not less than 54 atom % and not more than 58 atom %, and the Sn and/or Zn content is not less than 2 atom % and not more than 4 atom %.

The average thickness of the third coating layer is preferably not less than 0.1 μm and not more than 5.0 μm. The third coating layer having an average thickness of not less than 0.1 μm tends to allow pinholes to be prevented from piercing through the Fe part, and the third coating layer having an average thickness of not more than 5.0 μm tends to allow excessive Sn and/or Zn to be prevented from hardening the third coating layer, and tends to allow a decline in bonding strength of the third coating layer and the friction part to be suppressed. From the same point of view, the average thickness of the third coating layer is more preferably not less than 0.5 μm and not more than 3.0 μm, and further preferably not less than 1.0 μm and not more than 1.4 μm.

In the present embodiment, the thickness of each layer constituting the coating layer may be measured by a scanning electron microscope (SEM) or a transmission electron microscope (TEM). The composition of each layer constituting the coating layer can be measured by an energy dispersive X-ray spectrometry (EDX).

Fe Part

The main component of the Fe part used in the present embodiment is Fe. In the Fe part, the Fe content is not less than 50 mass %, preferably not less than 70 mass %, more preferably not less than 80 mass %, further preferably not less than 90 mass %, and particularly preferably not less than 98 mass %. In the Fe part, the upper limit of the Fe content is, for example, not more than 99.9 mass %, but is not particularly restricted thereto. This may sufficiently diffuse Fe into the first coating layer when the coating layer is formed over the surface of the Fe part.

Examples of a component other than Fe which may be contained in the Fe part include, but are not particularly limited to, at least one selected from the group of C, Si, Mn, P, S, Ni, Cr and Mo. Among them, C, Si, Mn, P and S are preferable.

Specific examples of the Fe part used in the present embodiment include, but are not particularly limited to, stainless steel, hot rolled steel sheets for automotive structural use, rolled steel for general structure, cold rolled steel sheets, carbon steel for machine structural use, and carbon tool steel. More specific examples thereof include, but are not particularly limited to, ferrite, SAPH440, SS400, S20C, S45C and SK85.

Friction Part

The friction part used in the present embodiment is formed on the surface of at least a part of the coating layer.

In the present embodiment, the friction part means a part having a higher coefficient of friction than the Fe part and the coating layer.

The friction part used in the present embodiment preferably comprises a matrix, a solid particle (hereinafter referred to as "a hard particle"), and a lubricant.

The matrix is preferably at least one selected from the group of metal, alloy, any metal compound, and any intermetallic compound. The friction part used in the present embodiment preferably contains not less than 40 mass % and not more than 80 mass % of the matrix based on the total mass of the friction part. When the matrix content is not less than 40 mass % based on the total mass of the friction part, the hard particle and the lubricant may be prevented from falling off in braking by means of a part using the friction material, such as a brake, or during intermittent engine drive transmission by means of a part using the friction material, such as a clutch, which may prevent wear resistance thereof from lowering. This may also improve the adhesion to a part intended to be bonded to the friction part by sintering, that is, the Fe part. In contrast, when the matrix content is not more than 80 mass % based on the total mass of the friction part, the friction part may be prevented from being too fine, which may improve the coefficient of friction.

The matrix preferably contains at least one element selected from the group of Cu, Sn, Zn, Ni, Fe, Mn and P, and more preferably contains at least one element selected from the group of Cu, Sn, Zn, Ni and Fe. The matrix containing such an element tends to improve the friction property and the mechanical strength of the friction part. The Cu content is preferably 0 to 90 mass %, more preferably 15 to 80 mass %, and further preferably 30 to 70 mass %, based on the total mass of the matrix. The Sn content is preferably 0 to 15 mass %, more preferably 0.5 to 13 mass %, and further preferably 1 to 10 mass %, based on the total mass of the matrix. The Zn content is preferably 0 to 13 mass %, more preferably 0.5 to 10 mass %, and further preferably 1 to 9 mass %, based on the total mass of the matrix. The Ni content is preferably 0 to 98 mass %, more preferably 10 to 80 mass %, and further preferably 20 to 70 mass %, based on the total mass of the matrix. The Fe content is preferably 0 to 50 mass %, more preferably 2 to 40 mass %, and further preferably 5 to 35 mass %, based on the total mass of the matrix. The Mn content is preferably 0 to 12 mass %, more preferably 0.5 to 8 mass %, and further preferably 1 to 7 mass %, based on the total mass of the matrix. The P content is preferably 0 to 8 mass %, more preferably 0.5 to 5 mass %, and further preferably 1 to 3 mass %, based on the total mass of the matrix. The matrix containing such an element in an amount within the foregoing ranges tends to further improve the friction property and the mechanical strength of the friction part.

The friction part used in the present embodiment preferably contains, as a hard particle, at least one selected from the group of carbide, nitride, oxide, and sulfide of at least one element selected from the group of Ti, Zr, Hf, V, Nb, Ta, Cr, Al, Mg and Si. The friction part used in the present embodiment containing such a hard particle has a high coefficient of friction, and is superior in wear resistance. The hard particle content is preferably not less than 5 mass % and not more than 30 mass % based on the total mass of the friction part. When the hard particle content is not less than 5 mass % based on the total mass of the friction part, the wear resistance of the friction part improves. In contrast, when the hard particle content is not more than 30 mass %, the matrix or the lubricant relatively increases, which improves the mechanical strength of the friction part, and makes it possible to suppress noise and shudders in braking or during intermittent transmission as described above. From the same point of view, the hard particle content is more preferably not less than 10 mass % and not more than 25 mass %, and further preferably not less than 10 mass % and not more than 20 mass %, based on the total mass of the friction part. The hard particle is preferably at least one selected from the group of carbide, nitride, oxide, and sulfide of at least one element selected from the group of Ti, Zr, Al, Mg, and Si, and more preferably at least one selected from the group of carbide and oxide of at least one element selected from the group of Ti, Zr, Al, Mg, and Si.

Specific examples of the hard particle include, but are not particularly limited to, aluminum oxide ($Al_2O_3$), zirconia ($ZrO_2$), silica ($SiO_2$), zircon sand ($ZrSiO_4$), rutile sand ($TiO_2$), magnesium oxide (MgO), and mullite ($3Al_2O_3 \cdot 2SiO_2$ to $2Al_2O_3 \cdot SiO_2$). Among them, aluminum oxide, zircon sand, mullite, and silica are preferable because being further superior in wear resistance.

The friction part used in the present embodiment preferably contains, as lubricant, at least one selected from the group of graphite (C), molybdenum disulfide ($MoS_2$), tungsten disulfide ($WS_2$), boron nitride (BN), and calcium fluoride ($CaF_2$). This may suppress noise and shudders in braking or during intermittent transmission as described above. The lubricant content is preferably not less than 5 mass % and not more than 40 mass % based on the total mass of the friction part. When the lubricant content is not less than 5 mass % based on the total mass of the friction part, noise and shudders may be suppressed. When the lubricant content is not more than 40 mass %, the coefficient of friction may be improved. From the same point of view, the lubricant content is more preferably not less than 10 mass % and not more than 30 mass %, and further preferably not less than 15 mass % and not more than 25 mass %.

The friction part used in the present embodiment may contain a friction modifier. The friction modifier content is preferably not less than 1 mass % and not more than 20 mass % based on the total mass of the friction part. The friction modifier content is preferably not less than 1 mass % and not more than 20 mass % based on the total mass of the friction part because making it possible to more effectively and surely adjust the mechanical strength of the friction part and the coefficient of friction in braking or during intermittent transmission as described above. From the same point of view, the friction modifier content is more preferably not less than 3 mass % and not more than 15 mass %, and further preferably not less than 3 mass % and not more than 10 mass %.

Specific examples of the friction modifier include, but are not particularly limited to, at least one selected from the group of talc ($Mg_3Si_4O_{10}(OH)_2$), mica, calcium carbonate ($CaCO_3$) and coke (C). Such a friction modifier is preferably contained because making it possible to further effectively and surely adjust the mechanical strength of the friction part and the coefficient of friction in braking or during intermittent transmission as described above.

The composition ratio in the friction part, and the element ratio in the matrix may be obtained as follows. One may polish a surface of the friction part, to measure a texture of the polished surface by an energy dispersive X-ray spectrometry (EDX), a wavelength dispersive X-ray spectroscopy (WDS), etc. accompanying a scanning electron microscope (SEM): SEM may magnify the texture of the friction part 50 to 2000 times, to obtain the composition ratio of the friction part by EDX; and SEM may magnify the texture of the friction part 3000 to 10000 times so that the texture does not contain the hard particle or the lubricant, to obtain the element ratio in the matrix by EDX.

Method of Producing Friction Material

A method of producing the friction material of the present embodiment will be described with reference to specific examples. The method of producing the friction material of the present embodiment is not particularly limited as long as the configurations of the friction material may be achieved thereby.

For example, the method of producing the friction material of the present embodiment comprises:

Step (A): a step of mixing a raw material powder comprising a metal powder to constitute the matrix, a hard particle powder, a lubricant powder, and a friction modifier powder to obtain a mixture, and molding the mixture into a predetermined shape to make the friction part;

Step (B): a step of forming a plated layer over the surface of the prepared Fe part by electroplating;

Step (C): a step of putting the made friction part on a surface of at least a part of the plated layer formed over the Fe part, putting this Fe part inside a furnace, and heating the Fe part; and Step (D): a step of, after heating the Fe part, cooling the inside of the furnace to room temperature, taking out the friction material from the furnace, and polishing a surface of the friction material until the friction material has predetermined dimensions.

Each step of the method of producing the friction material of the present embodiment has the following meaning.

In Step (A), the matrix, the hard particle, the lubricant, the friction modifier, etc. are suitably incorporated and mixed as a raw material powder of the friction part, which makes it possible to make a uniformly mixed friction part having a predetermined formulation. Instead of the metal powder, an alloy powder, a metal compound powder, or an intermetallic compound powder may be used.

In Step (B), the structure of the plated layer is made to be, for example, 1: Cu (1.5 to 5.0 µm in thickness), 2: Ni (9.0 to 20.0 µm in thickness), 3: Cu (2.0 to 9.0 µm in thickness), and 4/5: Sn and/or Zn (0.1 to 2.0 µm in thickness) in order from the Fe part side. Then, the structure is heated under the conditions described later, to thereby obtain a coating layer having predetermined configurations.

In Step (C), the made friction part is put on the surface of at least a part of the plated layer formed over the Fe part, then the friction part is put inside a furnace, and is heated under conditions of a temperature within a range of 800 to 950° C. for 0.5 to 3 hours in a reducing atmosphere (such as $H_2$, CO, $H_2S$ and $CH_4$) or an inert gas (such as $N_2$, $N_2+H_2$ and Ar gas) atmosphere, which makes it possible to obtain a coating layer having predetermined configurations, and which also makes the friction part dense and the mechanical strength thereof improved, and improves the adhesion of the friction part and the Fe part. When a pressure of 0.1 to 5 MPa is applied to the friction part in heating in an Ar gas atmosphere, the wear resistance of the friction part tends to improve.

Also in Step (C), the Fe content of not less than 50 mass % in the Fe part may diffuse Fe into the plated layer. At this time, a heating temperature of not less than 850° C. may easily diffuse Fe into the plated layer. Since depending on the Fe content, the thickness of the first coating layer may be adjusted by controlling the heating temperature and the heating time. The thickness of the second coating layer may be adjusted by controlling the thickness of the plated layer. The lower part and the upper part in the second coating layer may be formed by, for example, forming the plating layer in the order of 1: Cu, 2: Ni, and 3: Cu, wherein the layer 2: Ni is thinned, and the layer 3: Cu is thinned. When the third coating layer is formed, for example, after the layer 3: Cu is formed, a plated layer of Sn and/or Zn is further formed.

In Step (D), after the heating, the inside of the furnace is cooled to room temperature, the friction material is taken out from the furnace, and the surface of the friction material is polished, which may adjust the dimensions of the friction material.

Since superior in corrosion resistance, and superior in the adhesion of the back plate and the friction part, the friction material of the present embodiment may be used for equipment for controlling, as desired, rotation or movement of various types of machines such as machine tools, construction machinery, agricultural machinery, automobiles, two-wheeled vehicles, trains, aircrafts, and ships; such equipment is so-called clutches or brakes.

EXAMPLES

Hereinafter the present invention will be described in more detail with reference to Examples. The present invention is not limited to these Examples.

Making Friction Part

A raw material powder having the composition shown in the following Table 1 was mixed to obtain a mixture, and the mixture was molded to make a friction part.

TABLE 1

| | Cu | Sn | Zn | Ni | Fe | Graphite | Cokes | $ZrSiO_4$ | Mullite | $CaF_2$ |
|---|---|---|---|---|---|---|---|---|---|---|
| Friction part (mass %) | 36 | 5 | 2 | 20 | 5 | 12 | 5 | 7 | 5 | 3 |

Preparation of Fe Part

Fe parts 1 and 2 each having the composition shown in the following Table 2 were prepared.

TABLE 2

| | C | Si | Mn | P | S | Fe |
|---|---|---|---|---|---|---|
| Fe part 1 (mass %) | 0.20 | 0.24 | 0.45 | 0.06 | 0.01 | 99.04 |
| Fe part 2 (mass %) | 0.45 | 0.22 | 0.76 | 0.05 | 0.01 | 98.51 |

Example 1

First to fourth layers each having the composition, structure, and thickness shown in the following Table 3 were electroplated in order over a surface of the prepared Fe part 1 under generally employed conditions, to obtain a plated layer.

TABLE 3

| | Plated layer | | | | | | | | |
|---|---|---|---|---|---|---|---|---|---|
| | First layer | | Second layer | | Third layer | | Fourth layer | | Total |
| | Composition | Thickness (μm) | Composition | Thickness (μm) | Composition | Thickness (μm) | Composition | Thickness (μm) | thickness (μm) |
| Invention Product 1 | Cu | 3.0 | Ni | 12.0 | Cu | 5.0 | — | | 20.0 |
| Invention Product 2 | Cu | 1.5 | Ni | 13.5 | Cu | 5.0 | — | | 20.0 |
| Invention Product 3 | Cu | 3.0 | Ni | 12.0 | Cu | 5.0 | Sn | 0.5 | 20.5 |
| Invention Product 4 | Cu | 3.0 | Ni | 12.0 | Cu | 5.0 | Zn | 0.5 | 20.5 |
| Comparative Product 1 | Cu | 20.0 | — | | — | | — | | 20.0 |
| Comparative Product 2 | Ni | 20.0 | — | | — | | — | | 20.0 |
| Comparative Product 3 | Cu | 3.0 | Ni | 12.0 | Cu | 5.0 | — | | 20.0 |
| Comparative Product 4 | Cu | 3.0 | Ni | 12.0 | Cu | 5.0 | — | | 20.0 |

* "—" in Table indicates that no layer was formed.

The prepared friction part was put on a surface of the plated layer formed over the Fe part 1 to be put inside a furnace, and was heated under the conditions shown in the following Table 4 to adhere the Fe part 1 and the friction part via the plated layer, to make a friction material. After the heating, the inside of the furnace was cooled to room temperature, and the friction material was taken out from the furnace. The taken friction material was polished to adjust the dimensions thereof, to obtain a sample (Invention Samples 1 to 4 and Comparative Samples 1 to 4) that was a friction material in the form of a brake.

TABLE 4

| | Heating Treatment | | |
|---|---|---|---|
| | Temperature (° C.) | Atmosphere | Time (hour) |
| Invention Sample 1 | 900 | Ar | 2 |
| Invention Sample 2 | 850 | Ar | 0.5 |
| Invention Sample 3 | 900 | Ar | 2 |

TABLE 4-continued

| | Heating Treatment | | |
|---|---|---|---|
| | Temperature (° C.) | Atmosphere | Time (hour) |
| Invention Sample 4 | 900 | Ar | 2 |
| Comparative Sample 1 | 900 | Ar | 1 |
| Comparative Sample 2 | 900 | Ar | 1 |
| Comparative Sample 3 | 950 | Ar | 4 |
| Comparative Sample 4 | 700 | Ar | 1 |

For the obtained sample (Invention Samples 1 to 4 and Comparative Samples 1 to 4), the structure of a coating layer formed between the Fe part 1 and the friction part was measured as follows. The thickness of each layer constituting the coating layer was measured by means of a scanning electron microscope (SEM). The composition of each layer constituting the coating layer was measured by means of an energy dispersive X-ray spectrometry (EDX). The measurement results thereof are shown in the following Table 5.

TABLE 5

| | Coating layer | | | | | | | | | | | | | | | |
|---|---|---|---|---|---|---|---|---|---|---|---|---|---|---|---|---|
| | First coating layer | | | | Second coating layer | | | | Third coating layer | | | | | | | Total thickness (μm) |
| | Composition (atom %) | | | Thickness (μm) | Composition (atom %) | | | Thickness (μm) | Composition (atom %) | | | | | Thickness (μm) | |
| | Cu | Ni | Fe | | Cu | Ni | Fe | | Cu | Ni | Fe | Sn | Zn | | |
| Invention Sample 1 | 24 | 7 | 69 | 5.0 | 12 | 86 | 2 | 15.0 | None | | | | | | 20.0 |
| Invention Sample 2 | 43 | 40 | 17 | 1.5 | 15 | 85 | 0 | 18.5 | None | | | | | | 20.0 |
| Invention Sample 3 | 26 | 8 | 66 | 5.0 | 14 | 83 | 3 | 14.5 | 41 | 56 | 0 | 3 | 0 | 1.0 | 20.5 |
| Invention Sample 4 | 26 | 5 | 69 | 5.0 | 13 | 84 | 3 | 14.5 | 42 | 56 | 0 | 0 | 2 | 1.0 | 20.5 |
| Comparative Sample 1 | 32 | 0 | 68 | 6.0 | 96 | 0 | 4 | 14.0 | None | | | | | | 20.0 |
| Comparative Sample 2 | 0 | 28 | 72 | 5.5 | 0 | 95 | 5 | 14.5 | None | | | | | | 20.0 |

TABLE 5-continued

| | Coating layer | | | | | | | | | | | |
|---|---|---|---|---|---|---|---|---|---|---|---|---|
| | First coating layer | | | | Second coating layer | | | | Third coating layer | | | Total |
| | Composition (atom %) | | | Thickness | Composition (atom %) | | | Thickness | Composition (atom %) | | Thickness | thickness |
| | Cu | Ni | Fe | (μm) | Cu | Ni | Fe | (μm) | Cu Ni Fe Sn Zn | | (μm) | (μm) |
| Comparative Sample 3 | 8 | 3 | 89 | 12.0 | 42 | 50 | 8 | 8.0 | None | | | 20.0 |
| Comparative Sample 4 | None | | | 0.0 | 18 | 82 | 0 | 20.0 | None | | | 20.0 |

The following salt spray test, corrosion resistance test, and shear test were conducted on the obtained sample. The results thereof are shown in Table 8.

Salt Spray Test

The salt spray test was conducted in a manner conforming to "Methods of Corrosion Resistance Test For Metallic Coatings" in Japanese Industrial Standards (JIS H 8502) except that the concentration of salt water was adjusted to 5 mass % and the conditions shown in the following Table 6 were set.

TABLE 6

| Temperature | 35° C. |
|---|---|
| Humidity | 95% |
| Time | 24 hours |

The salt spray test was conducted on three samples, and it was observed whether the samples rusted or not (the external appearance was observed) after the test, to calculate the proportion of rust generation.

Corrosion Resistance Test

The corrosion resistance test was conducted in a manner conforming to "Test Procedure of Rusting at Material Interfaces for Disc Brake Pads of Automobiles" in Japanese Industrial Standards (JIS D 4419) except that the concentration of salt water was adjusted to 5 mass % and the conditions shown in the following Table 7 were set.

TABLE 7

| (i) Testing machine | Temperature | 50° C. |
|---|---|---|
| | Humidity | 95% |
| | Time | 72 hours |
| (ii) Air | Temperature | 23° C. |
| | Humidity | 50% |
| | Time | 24 hours |

The corrosion resistance test was conducted on nine of the samples. Three series of the corrosion resistance tests of 3 cycles, 6 cycles and 12 cycles were conducted on every three samples, where 1 cycle is constituted of the corrosion resistance test in (i) Testing machine in Table 7 and the corrosion resistance test in (ii) Air in Table 7. After each series was completed, the friction part and the Fe part of the sample were separated, deterioration of the plating on the Fe part side, and whether the Fe part rusted or not were observed, and the proportion of rust generation on the sample was calculated.

Shear Test

Shear strength was measured in a manner conforming to "Automotive Parts Drum Brake Shoe Assemblies and Disc Brake Pad Shear Test Procedure" in Japanese Industrial Standards (JIS D 4422). The shear test was conducted at 300° C. Shear strengths when the sample broke (MPa) are shown in Table 8. It is evaluated that as shear strength when the sample broke was higher, the adhesion was higher.

TABLE 8

| | Salt spray test Proportion of rust generation (%) | Corrosion resistance test Proportion of rust generation (%) | | | Shear test Shear strength (MPa) |
|---|---|---|---|---|---|
| | | 3 cycles | 6 cycles | 12 cycles | |
| Invention Sample 1 | 33 | 0 | 0 | 33 | 17 |
| Invention Sample 2 | 0 | 0 | 0 | 33 | 15 |
| Invention Sample 3 | 0 | 0 | 0 | 33 | 17 |
| Invention Sample 4 | 0 | 0 | 0 | 33 | 18 |
| Comparative Sample 1 | 100 | 100 | 100 | 100 | 17 |
| Comparative Sample 2 | 100 | 100 | 100 | 100 | 5 |
| Comparative Sample 3 | 100 | 100 | 100 | 100 | 14 |
| Comparative Sample 4 | 100 | 67 | 67 | 100 | 6 |

It is found from Table 8 that every Invention Sample had a proportion of rust generation in the salt spray test of not more than 33%, a proportion of rust generation in the corrosion resistance tests of 12 cycles of not more than 33%, and shear strength in the shear test of not less than 10 MPa, and thus generally had corrosion resistance and adhesion superior to Comparative Samples.

Example 2

First to fifth layers each having the composition, structure, and thickness shown in the following Table 9 were electroplated in order over a surface of the prepared Fe part 2 under generally employed conditions, to obtain a plated layer.

TABLE 9

| | Plated layer | | | | | |
|---|---|---|---|---|---|---|
| | First layer | | Second layer | | Third layer | |
| | Composition | Thickness (μm) | Composition | Thickness (μm) | Composition | Thickness (μm) |
| Invention Sample 5 | Cu | 4.0 | Ni | 15.0 | Cu | 3.0 |
| Invention Sample 6 | Cu | 4.0 | Ni | 15.0 | Cu | 3.0 |
| Invention Sample 7 | Cu | 4.0 | Ni | 12.0 | Cu | 5.0 |
| Invention Sample 8 | Cu | 4.0 | Ni | 18.0 | Cu | 7.0 |
| Invention Sample 9 | Cu | 4.0 | Ni | 14.0 | Cu | 3.0 |
| Invention Sample 10 | Cu | 4.0 | Ni | 14.0 | Cu | 3.0 |
| Invention Sample 11 | Cu | 4.0 | Ni | 14.0 | Cu | 3.0 |
| Invention Sample 12 | Cu | 2.0 | Ni | 10.0 | Cu | 4.0 |
| Comparative Sample 5 | Cu | 10.0 | Ni | 15.0 | Cu | 10.0 |
| Comparative Sample 6 | Cu | 8.0 | Ni | 3.0 | Cu | 11.0 |

| | Plated layer | | | | Total |
|---|---|---|---|---|---|
| | Fourth layer | | Fifth layer | | |
| | Composition | Thickness (μm) | Composition | Thickness (μm) | thickness (μm) |
| Invention Sample 5 | — | | — | | 22.0 |
| Invention Sample 6 | — | | — | | 22.0 |
| Invention Sample 7 | — | | — | | 21.0 |
| Invention Sample 8 | — | | — | | 29.0 |
| Invention Sample 9 | Sn | 1.0 | — | | 22.0 |
| Invention Sample 10 | Zn | 1.0 | — | | 22.0 |
| Invention Sample 11 | Sn | 0.5 | Zn | 0.5 | 22.0 |
| Invention Sample 12 | — | | — | | 16.0 |
| Comparative Sample 5 | — | | — | | 35.0 |
| Comparative Sample 6 | — | | — | | 22.0 |

* "—" in Table indicates that no layer was formed.

The prepared friction part was put on a surface of the plated layer formed over the Fe part 2 to be put inside a furnace, and was heated under the conditions shown in the following Table 10 to adhere the Fe part 2 and the friction part via the plated layer, to make a friction material. After the heating, the inside of the furnace was cooled to room temperature, and the friction material was taken out from the furnace. The taken friction material was polished to adjust the dimensions thereof, to obtain a sample (Invention Samples 5 to 12 and Comparative Samples 5 to 6) that was a friction material in the form of a brake.

TABLE 10

| | Heating Treatment | | |
|---|---|---|---|
| | Temperature (° C.) | Atmosphere | Time (hour) |
| Invention Sample 5 | 900 | Ar | 1 |
| Invention Sample 6 | 900 | $H_2$ | 1 |
| Invention Sample 7 | 900 | Ar | 1 |
| Invention Sample 8 | 900 | Ar | 2 |

TABLE 10-continued

| | Heating Treatment | | |
|---|---|---|---|
| | Temperature (°C.) | Atmosphere | Time (hour) |
| Invention Sample 9 | 900 | Ar | 1 |
| Invention Sample 10 | 900 | Ar | 1 |
| Invention Sample 11 | 950 | Ar | 1 |
| Invention Sample 12 | 900 | Ar | 1 |
| Comparative Sample 5 | 900 | Ar | 1 |
| Comparative Sample 6 | 900 | Ar | 2.5 |

For the obtained sample (Invention Samples 5 to 12 and Comparative Samples 5 and 6), the structure of a coating layer formed between the Fe part 2 and the friction part was measured in the same manner as in Example 1. The measurement results thereof are shown in the following Table 1.

TABLE 11

| | Coating layer | | | | | | | | | | | | | | | | |
|---|---|---|---|---|---|---|---|---|---|---|---|---|---|---|---|---|---|
| | First coating layer | | | | Second coating layer | | | | | | | | | Second coating layer | Third coating layer | | |
| | | | | | Lower part | | | | Upper part | | | | | | | | |
| | Composition (atom %) | | | Thickness | Composition (atom %) | | | Thickness | Composition (atom %) | | | Thickness | Total thickness of second coating layer | Composition (atom %) | | | Thickness | Total thickness |
| | Cu | Ni | Fe | (μm) | Cu | Ni | Fe | (μm) | Cu | Ni | Fe | (μm) | (μm) | Cu Ni Fe Sn Zn | | (μm) | (μm) |
| Invention Sample 5 | 28 | 8 | 64 | 2.8 | 10 | 88 | 2 | 14.6 | 24 | 75 | 1 | 4.6 | 19.2 | None | | | 22.0 |
| Invention Sample 6 | 22 | 5 | 73 | 3.4 | 13 | 83 | 4 | 13.4 | 32 | 66 | 2 | 5.2 | 18.6 | None | | | 22.0 |
| Invention Sample 7 | 35 | 3 | 62 | 2.6 | 15 | 85 | 0 | 10.2 | 38 | 62 | 0 | 8.2 | 18.4 | None | | | 21.0 |
| Invention Sample 8 | 20 | 7 | 73 | 5.2 | 8 | 91 | 1 | 18.4 | 45 | 55 | 0 | 5.4 | 23.8 | None | | | 29.0 |
| Invention Sample 9 | 26 | 7 | 67 | 2.6 | 10 | 89 | 1 | 14.4 | 26 | 74 | 0 | 3.6 | 18.0 | 38 58 0 4 0 | | 1.4 | 22.0 |
| Invention Sample 10 | 27 | 8 | 65 | 2.5 | 12 | 86 | 2 | 14.2 | 25 | 75 | 0 | 4.0 | 18.2 | 40 57 0 0 3 | | 1.3 | 22.0 |
| Invention Sample 11 | 19 | 10 | 71 | 3.8 | 10 | 87 | 3 | 13.5 | 22 | 77 | 1 | 3.5 | 17.0 | 42 54 0 2 2 | | 1.2 | 22.0 |
| Invention Sample 12 | 16 | 14 | 70 | 2.6 | 8 | 91 | 1 | 10.6 | 28 | 72 | 0 | 2.8 | 13.4 | None | | | 16.0 |
| Comparative Sample 5 | 35 | 2 | 63 | 2.6 | 14 | 86 | 0 | 21.0 | 32 | 66 | 2 | 11.4 | 32.4 | None | | | 35.0 |
| Comparative Sample 6 | 32 | 2 | 66 | 7.0 | 12 | 82 | 6 | 5.8 | 68 | 30 | 2 | 9.2 | 15.0 | None | | | 22.0 |

The salt spray test, corrosion resistance test, and shear test were conducted on the obtained sample in the same manner as in Example 1. The results thereof are shown in Table 12.

TABLE 12

| | Salt spray test Proportion of rust generation (%) | Corrosion resistance test Proportion of rust generation (%) | | | Shear test Shear strength (MPa) |
|---|---|---|---|---|---|
| | | 3 cycles | 6 cycles | 12 cycles | |
| Invention Sample 5 | 0 | 0 | 0 | 0 | 16 |
| Invention Sample 6 | 0 | 0 | 0 | 0 | 17 |
| Invention Sample 7 | 0 | 0 | 0 | 33 | 16 |
| Invention Sample 8 | 0 | 0 | 0 | 0 | 16 |
| Invention Sample 9 | 0 | 0 | 0 | 0 | 18 |
| Invention Sample 10 | 0 | 0 | 0 | 0 | 18 |
| Invention Sample 11 | 0 | 0 | 0 | 0 | 19 |
| Invention Sample 12 | 0 | 0 | 0 | 33 | 16 |
| Comparative Sample 5 | 0 | 0 | 0 | 67 | 5 |
| Comparative Sample 6 | 0 | 0 | 0 | 67 | 5 |

It is found from Table 12 that every Invention Sample had a proportion of rust generation in the salt spray test of 0%, a proportion of rust generation in the corrosion resistance tests of 12 cycles of not more than 33%, and shear strength in the shear test of not less than 10 MPa, and thus generally had corrosion resistance and adhesion superior to Comparative Samples.

INDUSTRIAL APPLICABILITY

Since superior in corrosion resistance, and superior in the adhesion of the back plate and the friction part, the friction material of the present embodiment may be used for equipment for controlling, as desired, rotation or movement of various types of machines such as machine tools, construction machinery, agricultural machinery, automobiles, two-wheeled vehicles, trains, aircrafts, and ships; such equipment is so-called clutches or brakes.

What is claimed is:

1. A friction material comprising: a Fe part which contains Fe as a main component; a coating layer formed over a surface of the Fe part; and a friction part formed on a surface of at least a part of the coating layer, wherein:
the coating layer comprises a first coating layer and a second coating layer in order from Fe part side,
the first coating layer is constituted of an alloy containing Cu, Ni and Fe such that Fe content be not less than 10 atom %,
the second coating layer is constituted of an alloy containing Cu and Ni, or an alloy containing Cu, Ni and Fe such that Fe content be less than 10 atom %,
an average thickness of the first coating layer is not less than 1.0 μm and not more than 6.0 μm; and
an average thickness of the second coating layer is not less than 9.5 μm and not more than 24.0 μm.

2. The friction material according to claim 1, wherein the first coating layer contains not less than 1 atom % and not more than 45 atom % of Cu, not less than 1 atom % and not more than 45 atom % of Ni, and not less than 10 atom % and not more than 95 atom % of Fe.

3. The friction material according to claim 1, wherein the second coating layer contains not less than 5 atom % and not more than 60 atom % of Cu, not less than 40 atom % and not more than 95 atom % of Ni, and not less than 0 atom % and less than 10 atom % of Fe.

4. The friction material according to claim 1, wherein:
the second coating layer comprises a lower part and an upper part in order from first coating layer side,
the lower part contains not less than 5 atom % and less than 20 atom % of Cu; and
the upper part contains not less than 20 atom % and not more than 60 atom % of Cu.

5. The friction material according to claim 4, wherein an average thickness of the lower part is not less than 8.0 μm and not more than 20.0 μm, and an average thickness of the upper part is not less than 1.5 μm and not more than 10.0 μm.

6. The friction material according to claim 4, wherein the lower part contains not less than 5 atom % and less than 20 atom % of Cu, more than 80 atom % and not more than 95 atom % of Ni, and not less than 0 atom % and less than 10 atom % of Fe.

7. The friction material according to claim 4, wherein the upper part contains not less than 20 atom % and not more than 60 atom % of Cu, not less than 40 atom % and not more than 80 atom % of Ni, and not less than 0 atom % and not more than 2 atom % of Fe.

8. The friction material according to claim 1, wherein:
the coating layer comprises a third coating layer over a surface of the second coating layer, the surface being opposite to Fe part side,
the third coating layer is constituted of an alloy containing Cu, Ni and Sn, an alloy containing Cu, Ni and Zn, or an alloy containing Cu, Ni, Sn and Zn; and
an average thickness of the third coating layer is not less than 0.1 μm and not more than 5.0 μm.

9. The friction material according to claim 8, wherein the third coating layer contains not less than 30 atom % and not more than 69.5 atom % of Cu, not less than 30 atom % and not more than 69.5 atom % of Ni, and not less than 0.5 atom % not more than 5 atom % of Sn and/or Zn.

10. The friction material according to claim 1, wherein an average thickness of the coating layer is not less than 10.5 μm and less than 30.0 μm.

11. The friction material according to claim 2, wherein the second coating layer contains not less than 5 atom % and not more than 60 atom % of Cu, not less than 40 atom % and not more than 95 atom % of Ni, and not less than 0 atom % and less than 10 atom % of Fe.

12. The friction material according to claim 2, wherein:
the second coating layer comprises a lower part and an upper part in order from first coating layer side,
the lower part contains not less than 5 atom % and less than 20 atom % of Cu; and
the upper part contains not less than 20 atom % and not more than 60 atom % of Cu.

13. The friction material according to claim 3, wherein:
the second coating layer comprises a lower part and an upper part in order from first coating layer side,
the lower part contains not less than 5 atom % and less than 20 atom % of Cu; and
the upper part contains not less than 20 atom % and not more than 60 atom % of Cu.

14. The friction material according to claim 11, wherein:
the second coating layer comprises a lower part and an upper part in order from first coating layer side,
the lower part contains not less than 5 atom % and less than 20 atom % of Cu; and
the upper part contains not less than 20 atom % and not more than 60 atom % of Cu.

15. The friction material according to claim 5, wherein the lower part contains not less than 5 atom % and less than 20 atom % of Cu, more than 80 atom % and not more than 95 atom % of Ni, and not less than 0 atom % and less than 10 atom % of Fe.

16. The friction material according to claim 5, wherein the upper part contains not less than 20 atom % and not more than 60 atom % of Cu, not less than 40 atom % and not more than 80 atom % of Ni, and not less than 0 atom % and not more than 2 atom % of Fe.

17. The friction material according to claim 6, wherein the upper part contains not less than 20 atom % and not more than 60 atom % of Cu, not less than 40 atom % and not more than 80 atom % of Ni, and not less than 0 atom % and not more than 2 atom % of Fe.

18. The friction material according to claim 15, wherein the upper part contains not less than 20 atom % and not more than 60 atom % of Cu, not less than 40 atom % and not more than 80 atom % of Ni, and not less than 0 atom % and not more than 2 atom % of Fe.

19. The friction material according to claim 2, wherein:
the coating layer comprises a third coating layer over a surface of the second coating layer, the surface being opposite to Fe part side,
the third coating layer is constituted of an alloy containing Cu, Ni and Sn, an alloy containing Cu, Ni and Zn, or an alloy containing Cu, Ni, Sn and Zn; and
an average thickness of the third coating layer is not less than 0.1 μm and not more than 5.0 μm.

20. The friction material according to claim 3, wherein:
the coating layer comprises a third coating layer over a surface of the second coating layer, the surface being opposite to Fe part side,
the third coating layer is constituted of an alloy containing Cu, Ni and Sn, an alloy containing Cu, Ni and Zn, or an alloy containing Cu, Ni, Sn and Zn; and
an average thickness of the third coating layer is not less than 0.1 μm and not more than 5.0 μm.

* * * * *